United States Patent
Yan et al.

(10) Patent No.: US 11,128,716 B1
(45) Date of Patent: Sep. 21, 2021

(54) SYSTEM AND METHOD FOR MONITORING USAGE IN A CONVERGED CHARGING SYSTEM

(71) Applicant: Verizon Patent and Licensing Inc., Basking Ridge, NJ (US)

(72) Inventors: Lixia Yan, Basking Ridge, NJ (US); Barry F. Hoffner, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/156,806

(22) Filed: Jan. 25, 2021

(51) Int. Cl.
    *G06F 15/16* (2006.01)
    *H04L 29/08* (2006.01)
    *H04L 12/26* (2006.01)

(52) U.S. Cl.
    CPC .......... *H04L 67/14* (2013.01); *H04L 43/0876* (2013.01); *H04L 43/16* (2013.01)

(58) Field of Classification Search
    CPC ...... H04L 67/14; H04L 43/0876; H04L 43/16
    USPC ....................................................... 709/224
    See application file for complete search history.

(56) References Cited

U.S. PATENT DOCUMENTS

| | | | |
|---|---|---|---|
| 8,914,025 B2 * | 12/2014 | Mathias | H04W 48/17 455/435.1 |
| 10,256,985 B2 * | 4/2019 | Peebles | H04W 4/24 |
| 10,291,789 B2 * | 5/2019 | Nah | H04M 15/8214 |
| 10,911,428 B1 * | 2/2021 | Roth | H04L 63/10 |
| 2017/0310495 A1 * | 10/2017 | Peebles | G06Q 30/0207 |
| 2018/0316514 A2 * | 11/2018 | Peebles | G06Q 30/02 |
| 2019/0305975 A1 * | 10/2019 | Lovsen | H04L 12/1446 |

* cited by examiner

*Primary Examiner* — Moustafa M Meky

(57) ABSTRACT

Systems and methods described herein include receiving, at a network device, a message including an identifier associated with a subscriber and an identifier associated with a rating group associated with one or more data flows and determining a data quota and one or more usage monitoring thresholds associated with the subscriber. The data quota indicates a first amount of data associated with the rating group that the subscriber is authorized to use during a time period and the one or more usage monitoring thresholds indicate one or more second amounts of data associated with the rating group and one or more service flows that the subscriber is authorized to use during the time period. The network device transmits the data quota and the one or more usage monitoring thresholds, receives data usage information, and processes the data usage information.

20 Claims, 6 Drawing Sheets

SYSTEM AND METHOD FOR MONITORING USAGE IN A CONVERGED CHARGING SYSTEM

BACKGROUND

Currently, there are a number of types of mechanisms for charging and billing wireless customers for data usage. In a converged charging system, a charging function (CHF) is responsible for charging functionalities. The CHF performs quota management by storing a data quota for subscribers and keeping track of how much data a subscriber has used and how much data remains for the subscriber to use. The CHF additionally performs usage management and reporting by receiving subscriber data usage information and generating data records with detailed breakdowns of the data usage.

DETAILED DESCRIPTION OF THE PREFERRED EMBODIMENTS

Figure 1:
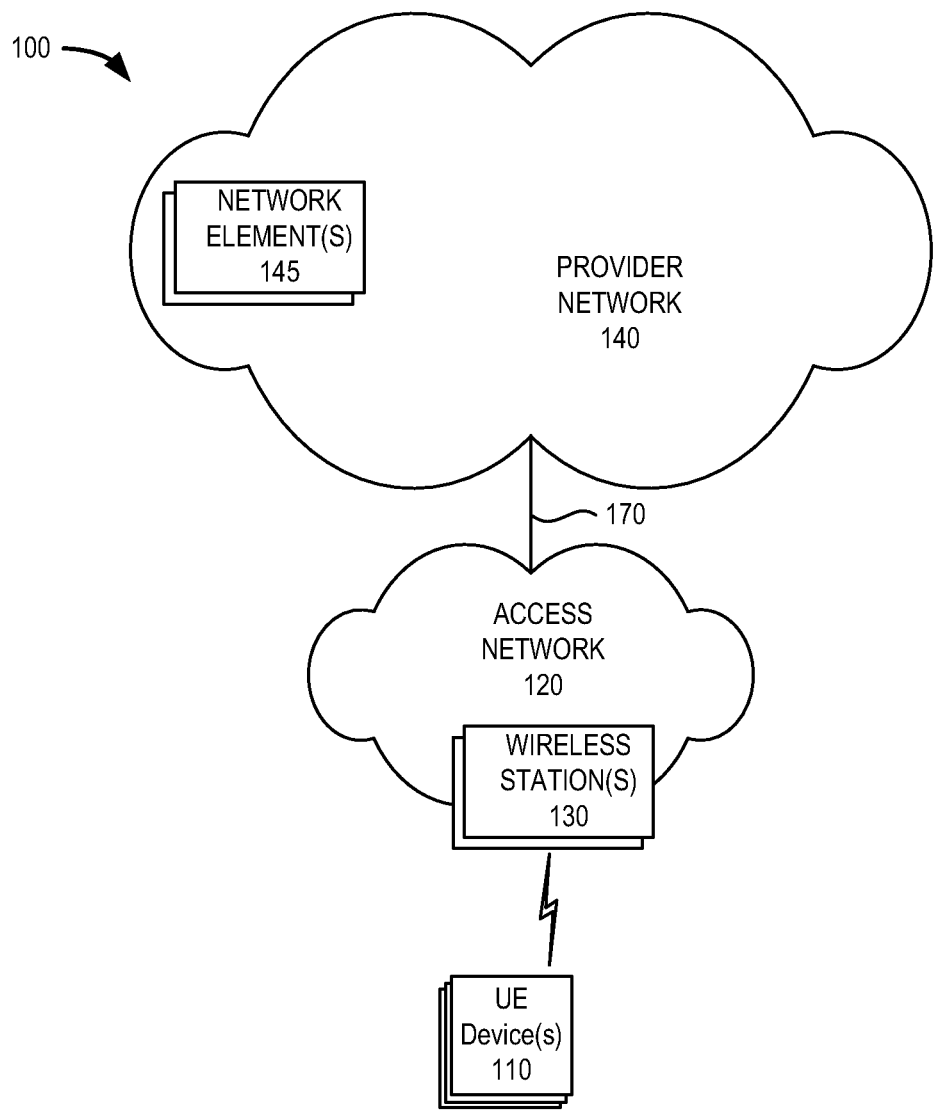
FIG. 1 is a diagram illustrating a network environment according to an implementation described herein.

The following detailed description refers to the accompanying drawings. The same reference numbers in different drawings may identify the same or similar elements. Also, the following detailed description does not limit the invention.

In a Fifth Generation (5G) network, the CHF may be in charge of the data resource management. The CHF may store and keep track of the subscriber data quotas and data usage. For example, a subscriber may be allotted a particular amount of data to be used over a particular amount of time (e.g., one month) and the CHF may store an indication of the subscriber's data quota for the month. In addition, as the subscriber consumes data, the CHF may be updated with the subscriber's data usage. For example, a network function (NF) may report data usage to the CHF periodically (i.e., every hour, every four hours, every day, etc.). The CHF may keep track of the amount of data that has been consumed and the amount of data that remains available to the subscriber for the period of time. If the subscriber reaches the data limit before the end of the period of time, the subscriber may not be able to use additional data or the subscriber may be given an option to purchase the right to use additional data. For example, the CHF may be in charge of triggering a reauthorization for the purchase of additional data usage.

Service flows may be identified based on a combination of a rating group (RG) number and a service identifier (SID). For example, a Fourth Generation (4G) data service flow may be identified by a combination of the rating group number 7300 and service identifier 1 (RG=7300+SID=1) and a 5G data service flow may be identified by a combination of the rating group number 7300 and the service identifier 2 (RG=7300+SID=2). When the NF reports data usage to the CHF after a period of time, the NF may indicate how much data was used in each service flow during the period of time. For example, the NF may report that the subscriber used 0.3 gigabytes (GB) of data while in 4G coverage (RG=7300+SID=1) and 0.7 GB of data while in 5G coverage (RG=7300+SID=2). Currently, when the CHF grants a data quota for a subscriber, the CHF may grant the data quota based on a quota for the rating group and not based on a quota per service identifier or service flow. Therefore, all of the service flows belonging to the same rating group will be allowed to use the allotment of data assigned to the rating group. However, since different service flows may be charged differently or different data flows may have different usage limits, it may be useful to provide a data quota based on rating group and provide a usage monitoring threshold at a service identifier level.

Systems and methods described herein provide a mechanism for providing an additional layer of usage monitoring control on a per service flow or service identifier basis. Implementations described herein may allow data to be used by a subscriber on a per service flow basis. In one implementation, usage monitoring may be performed by an NF for a rating group and service identifier pair and a limitation may be placed on the amount of data that may be consumed for the rating group and service identifier pair in a particular amount of time. In this implementation, a data quota may be set at a per rating group level and a usage monitoring threshold may be set at a per service flow level. In this implementation, the CHF may be notified when a subscriber consumes an amount of data indicated by the data quota for flows in the rating group or when the subscriber consumes the amount of data indicated by the usage monitoring threshold for a flow indicated by the service flow in the particular amount of time.

For example, 1 GB of data may be granted to a rating group 7300 (RG=7300) and a usage monitoring threshold for service identifier 1 (RG=7300+SID=1) may be set to 0.5 GB. In this example, a subscriber may be allowed to use up to 1 GB of data for a combination of all flows in rating group 7300 and the subscriber may be allowed to use 0.5 GB of data for the data flow RG=7300+SID=1. In this example, if the subscriber consumes 0.5 GB of data for the data flow RG=7300+SID=1 or if the subscriber consumes 1 GB of data using any flow in RG=7300 or a combination of flows in RG=7300, the CHF may be notified that the usage monitoring threshold or the data flow has been reached.

In another implementation, usage monitoring may be performed by an NF for a group of service flows in the same rating group and a limitation may be placed on the amount of data that may be consumed by the group of service identifiers corresponding to the service flows in a particular amount of time. In another implementation, usage monitoring may be performed by the NF at the rating group level without one or more service identifiers.

Implementations described herein may enhance the interface between the NF and the CHF to allow for the quota management based on service identifiers. In one implementation, new data structures may be added to the interface to allow the usage monitoring based on service identifiers. In another implementation, new functions may be added to the NF and CHF to support the new data structures.

Implementations described herein may provide for usage monitoring at a per service identifier level. In one implementation, the CHF may indicate a volume threshold for a particular service identifier and an NF may report usage to the CHF when the volume threshold enforced by the CHF at service identifier level is reached. In another implementation, the CHF may add the reported usage to a counter and calculate a new volume threshold for the service identifier based on the remaining data allotted to a subscriber.

FIG. 1 is a diagram illustrating concepts described herein. As shown in FIG. 1, an environment 100 may include one or more user equipment (UE) devices 110 (referred to herein collectively as UEs 110 or individually as UE 110), an access network 120, one or more wireless stations 130, and a provider network 140.

UE 110 may include: a wireless Machine-Type-Communication (MTC) device that communicates wirelessly with other devices over a machine-to-machine (M2M) interface; a handheld wireless communication device; a wearable computer device (e.g., a head-mounted display computer device, a head-mounted camera device, a wristwatch computer device, etc.); a global positioning system (GPS) device; a media playing device; a portable gaming system; a laptop, tablet, or another type of portable computer; a smartphone; and/or any other type of computer device with wireless communication capabilities. UE 110 may be used for voice communication, mobile broadband services (e.g., video streaming, real-time gaming, premium Internet access etc.), best-effort data traffic, and/or other types of applications.

Access network 120 may provide access to provider network 140 for wireless devices, such as UE 110. Access network 120 may enable UE 110 to connect to provider network 140 for Internet access, non-Internet Protocol (IP) data delivery, cloud computing, mobile telephone service, Short Message Service (SMS) message service, Multimedia Message Service (MMS) message service, and/or other types of data services. Access network 120 may include wireless stations 130, and UE 110 may wirelessly communicate with access network 120 via wireless station 130. Access network 120 may establish a connection between UE 110 and provider network 140. In another implementation, access network 120 may provide access to a service or application layer network, a cloud network, a multi-access edge computing (MEC) network, a fog network, and so forth. Furthermore, access network 120 may enable a server device to exchange data with UE 110 using a non-IP data delivery method such as Data over Non-Access Stratum (DoNAS).

Access network 120 may include a 5G access network or another advanced network, such as a Fourth Generation (4G) access network. Additionally access network 120 may include functionality such as a mm-wave Radio Access Network (RAN). Network 120 may support advanced or massive multiple-input and multiple-output (MIMO) antenna configurations (e.g., an 8×8 antenna configuration, a 16×16 antenna configuration, a 256×256 antenna configuration, etc.); cooperative MIMO (CO-MIMO); carrier aggregation; relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of 5G functionality.

Wireless station 130 may include a gNodeB base station device and/or an eNodeB base station device that includes one or more devices (e.g., wireless transceivers) and other components and functionality that allow UE 110 to wirelessly connect to access network 120 through wireless station 130. Wireless station 130 may correspond to a macrocell or to a small cell (e.g., a femtocell, a picocell, a microcell, etc.). In other implementations, wireless station 130 may include another type of base station. Wireless stations 130 may connect to provider network 140 via backhaul links 170.

Provider network 140 may include a local area network (LAN), a wide area network (WAN), a metropolitan area network (MAN), an optical network, a cable television network, a satellite network, a wireless network (e.g., a code-division multiple access (CDMA) network, a general packet radio service (GPRS) network, and/or a long-term evolution (LTE) network), an ad hoc network, a telephone network (e.g., the Public Switched Telephone Network (PSTN) or a cellular network), an intranet, or a combination of networks. In one implementation, provider network 140 may allow the delivery of Internet Protocol (IP) services to UE 110, and may interface with other external networks, such as private IP networks.

According to one implementation, provider network 140 may include a core network for one or multiple access networks 120. For example, provider network 140 may include the core part of a 5G New Radio network, etc. An IMS network may include a network for delivering IP multimedia services and may provide media flows between UE 110 and external IP networks (not shown in FIG. 1).

Although FIG. 1 shows exemplary components of environment 100, in other implementations, environment 100 may include fewer components, different components, differently arranged components, or additional functional components than depicted in FIG. 1. For example, in one implementation, environment 100 may include an MEC network that provides applications and services at the edge of a network, such as provider network 140. Additionally or alternatively, one or more components of environment 100 may perform functions described as being performed by one or more other components of environment 100.

Figure 2:
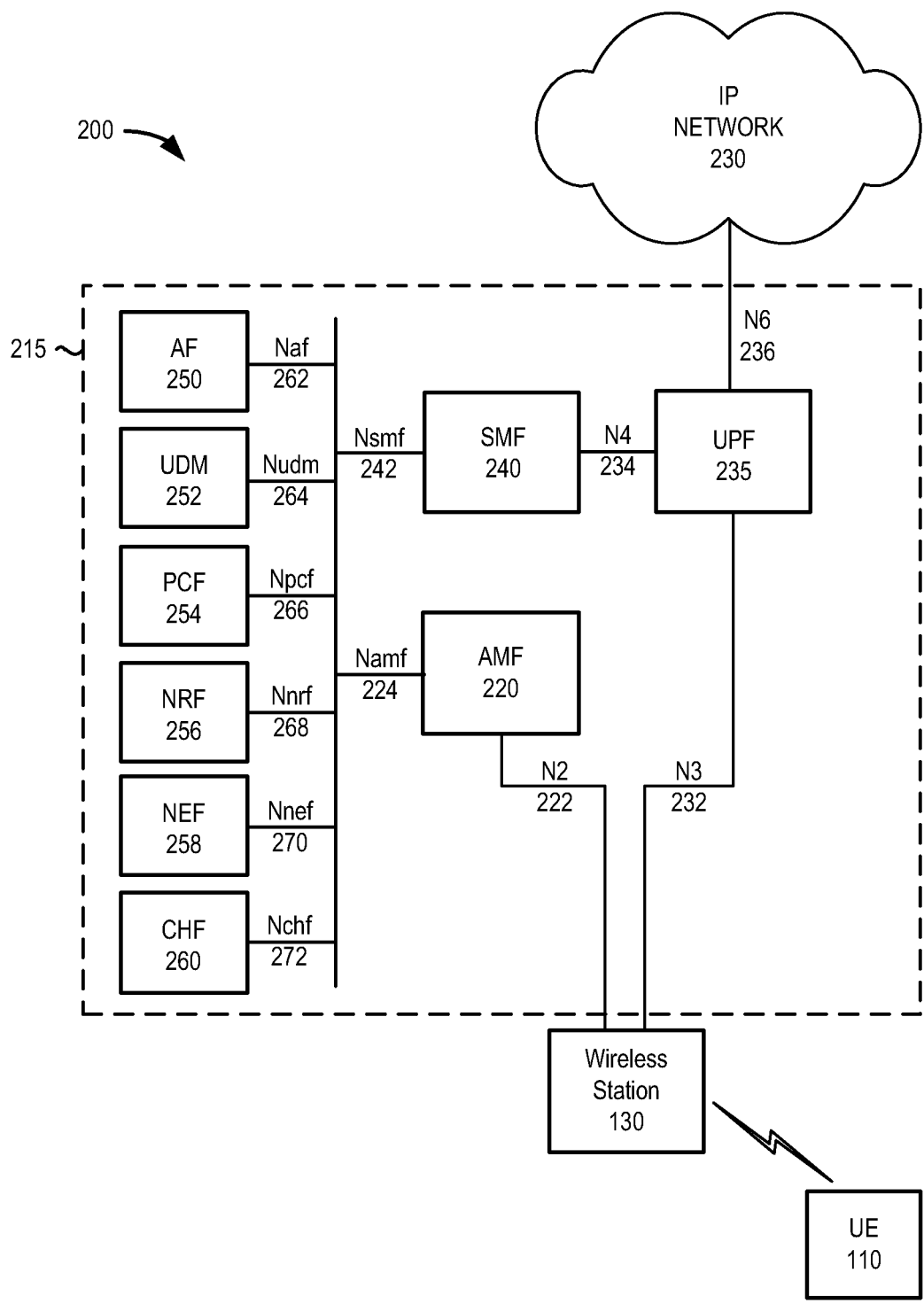
FIG. 2 is a diagram illustrating connections among devices in an exemplary portion of the network environment of FIG. 1.

FIG. 2 is a diagram illustrating a network environment 200 that includes exemplary components of environment 100 according to an implementation described herein. As shown in FIG. 2, network environment 200 may include UE 110, wireless station 130, a core network 215, and an IP network 230. Core network 215 and IP network 230 may correspond to, or be included in, provider network 140.

Core network 215 may include an Access and Mobility Management Function (AMF) 220, a User Plane Function (UPF) 235, a Session Management Function (SMF) 240, an Application Function (AF) 250, a Unified Data Management (UDM) 252, a Policy Control Function (PCF) 254, a Network Repository Function (NRF) 256, a Network Exposure Function (NEF) 258, and a Charging Function (CHF) 260. AMF 220, UPF 235, SMF 240, AF 250, UDM 252, PCF 254, NRF 256, NEF 258, and CHF 260 may correspond to network elements 145 of FIG. 1 and may each be implemented as separate network devices or as nodes shared among one or more network devices. While FIG. 2 depicts a single AMF 220, UPF 235, SMF 240, AF 250, UDM 252, PCF 254, NRF 256, NEF 258, and CHF 260 for illustration purposes, in practice, FIG. 2 may include multiple wireless stations 130, AMFs 220, UPFs 235, SMFs 240, AFs 250, UDMs 252, PCFs 254, NRFs 256, NEFs 258, and/or CHFs 260.

Wireless station 130 may include one or more devices and components to enable UE 110 to wirelessly connect to access network 120 using 5G Radio Access Technology (RAT). Wireless station 130 may include, for example, a gNodeB (gNB) with a wireless transceiver with an antenna array configured for mm-wave wireless communication. In other implementations, wireless station 130 may include another type of base station, such as eNodeB (eNB). According to implementations described herein, wireless station 130 may receive and store network slice data which may be used for applying intelligent admission control during an initial attachment process for UE device 110.

AMF 220 may perform registration management, connection management, reachability management, mobility management, lawful intercepts, Short Message Service (SMS) transport between UE 110 and an SMS function (not shown in FIG. 2), session management messages transport between UE 110 and SMF 240, access authentication and authorization, location services management, functionality to support non-3GPP access networks, and/or other types of management processes.

UPF 235 may maintain an anchor point for intra/inter-RAT mobility, maintain an external Packet Data Unit (PDU) point of interconnect to a data network (e.g., IP network 230, etc.), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, send and forward an "end marker" to a Radio Access Network (RAN) node (e.g., wireless station 130), and/or perform other types of user plane processes.

SMF 240 may perform session establishment, modification, and/or release, perform IP address allocation and management, perform Dynamic Host Configuration Protocol (DHCP) functions, perform selection and control of UPF 235, configure traffic steering at UPF 235 to guide traffic to the correct destination, terminate interfaces toward PCF 254, perform lawful intercepts, charge data collection, support charging interfaces, control and coordinate charging data collection, termination of session management parts of Non-Access Stratum (NAS) messages, perform downlink data notification, manage roaming functionality, and/or perform other types of control plane processes for managing user plane data. SMF 240 may receive quota information from CHF 260 and may report data usage information to CHF 260. SMF 240 may store a mapping table to map rating groups and service identifiers to particular data flows. SMF 240 may be accessible via an Nsmf interface 242.

AF 250 may provide services associated with a particular application, such as, for example, application influence on traffic routing, accessing NEF 258, interacting with a policy framework for policy control, and/or other types of applications.

UDM 252 may maintain subscription information for UEs 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data.

PCF 254 may support policies to control network behavior, provide policy rules to control plane functions (e.g., to SMF 240), access subscription information relevant to policy decisions, perform policy decisions, and/or perform other types of processes associated with policy enforcement.

NRF 256 may support a service discovery function and maintain a profile of available network function (NF) instances and their supported services. An NF profile may include an NF instance identifier (ID), an NF type, a Public Land Mobile Network identifier (PLMN-ID) associated with the NF, a network slice ID associated with the NF, capacity information for the NF, service authorization information for the NF, supported services associated with the NF, endpoint information for each supported service associated with the NF, and/or other types of NF information.

NEF 258 may expose capabilities and events to other NFs, including third-party NFs, AFs, edge computing NFs, and/or other types of NFs. Furthermore, NEF 258 may secure provisioning of information from external applications to access network 120, translate information between access network 120 and devices/networks external to access network 120, support a Packet Flow Description (PFD) function, and/or perform other types of network exposure functions.

CHF 260 may provide an interface to a converged charging system. CHF 260 may include the interface between the converged charging system and the provider network 140. CHF 260 may provide spending limits and quotas for services to SMF 240 and may collect usage information from SMF 240 for online and offline services. The CHF 260 may generate call detail records (CDRs) based on the subscriber's data consumption and the CDRs may be used for performing billing. CHF 260 may provide a notification when a Charging Domain determines that rating conditions are affected or when CHF 260 determines to terminate a charging service. CHF 260 may receive usage reports from a NF Service Consumer. CHF 260 may be accessible via Nchf interface 272. Nchf interface 272 may include data structures that allow data usage monitoring on a service identifier level.

Although FIG. 2 shows exemplary components of core network 215, in other implementations, core network 215 may include fewer components, different components, differently arranged components, or additional components than depicted in FIG. 2. Additionally or alternatively, one or more components of core network 215 may perform functions described as being performed by one or more other components of core network 215. For example, core network 215 may include additional function nodes not shown in FIG. 2, such as an Authentication Server Function (AUSF), a Non-3GPP Interworking Function (N3IWF), a Unified Data Repository (UDR), or other 5G network functions.

Figure 3:
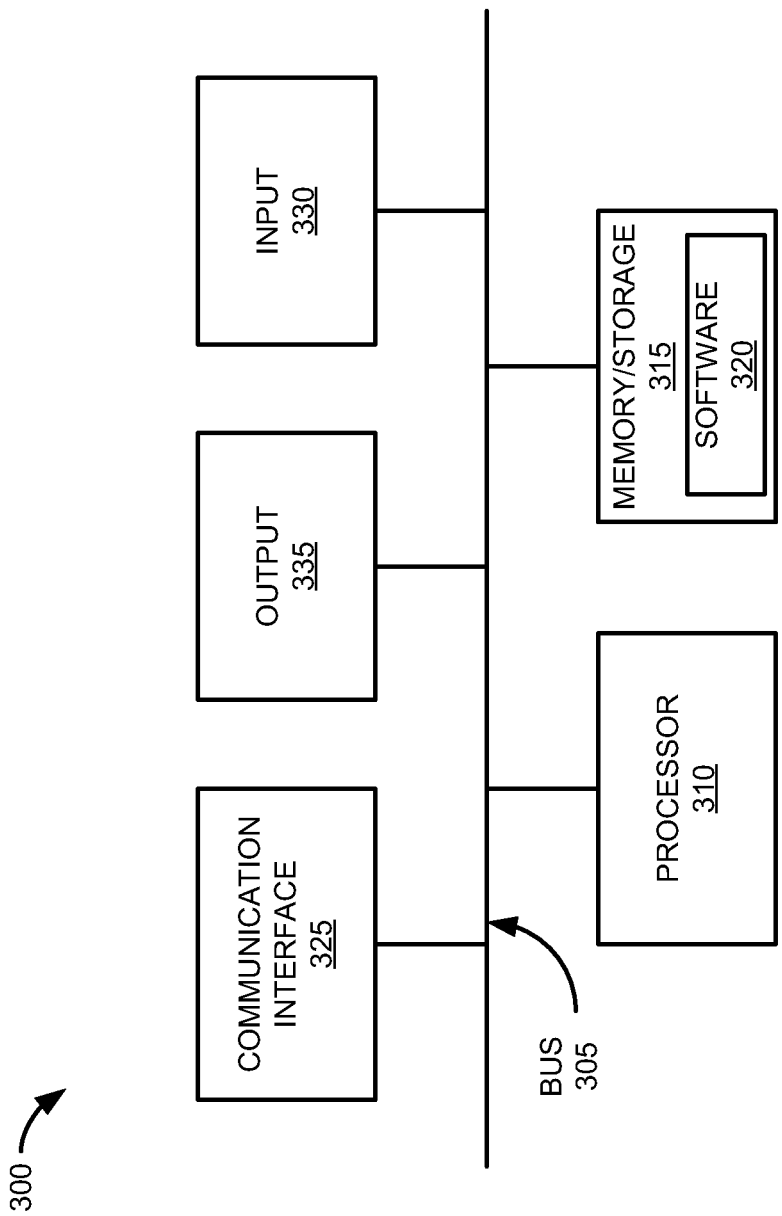
FIG. 3 is a diagram of exemplary components that may be included in one or more of the devices shown in FIGS. 1 and 2.

FIG. 3 is a diagram illustrating exemplary components of a device 300 that may correspond to one or more of the devices described herein. For example, device 300 may correspond to components included in UE 110, wireless station 130, network elements 145, AMF 220, UPF 235, SMF 240, AF 250, UDM 252, PCF 254, NRF 256, NEF 258, CHF 260, and/or other components of access network 120 and/or provider network 140. As illustrated in FIG. 3, according to an exemplary embodiment, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc. Processor 310 may be a dedicated component or a non-dedicated component (e.g., a shared resource).

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include a drive for reading from and writing to the storage medium.

Memory/storage 315 may be external to and/or removable from device 300, such as, for example, a Universal Serial Bus (USB) memory stick, a dongle, a hard disk, mass storage, off-line storage, network attached storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. Software 320 may include an operating system. Software 320 is also intended to include firmware, middleware, microcode, hardware description language (HDL), and/or other forms of instruction. Additionally, for example, 5G UE 110 may include logic to perform tasks, as described herein, based on software 320.

Communication interface 325 permits device 300 to communicate with other devices, networks, systems, devices, and/or the like. Communication interface 325 includes one or multiple radio frequency (RF) wireless interfaces and/or wired interfaces. For example, communication interface 325 may include one or multiple transmitters and receivers, or transceivers. Communication interface 325 may include one or more antennas. For example, communication interface 325 may include an array of antennas. Communication interface 325 may operate according to a protocol stack and a communication standard. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4:
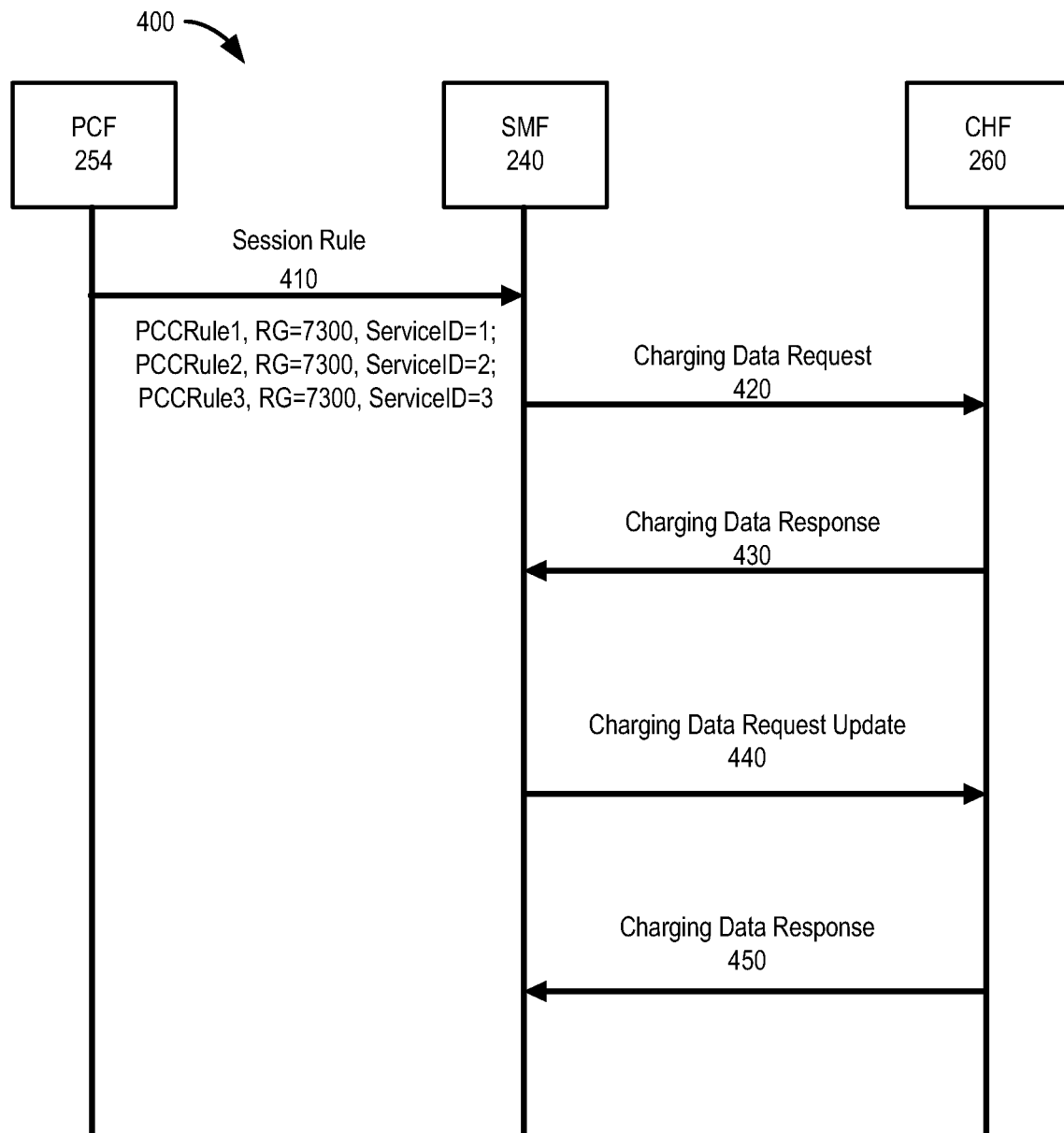
FIG. 4 is a signal flow diagram illustrating exemplary communications for performing data usage monitoring, according to an implementation described herein.

FIG. 4 is a diagram illustrating exemplary communications for providing data usage monitoring. Network portion 400 may include PCF 254, SMF 240, and CHF 260. Communications shown in FIG. 4 provide simplified illustrations of communications in network portion 400 and are not intended to reflect every signal or communication exchanged between devices. Furthermore, additional information not described herein may be communicated with some signals or communications.

As shown in FIG. 4, at signal 410, PCF 254 may send a message to SMF 240 including a session rule for a user session. The session rule may include multiple policy and charging control (PCC) rules. As shown in FIG. 4, and merely as an example, the first PCC rule, which is called PCCRule1, has an RG of 7300 and service identifier of 1. PCCRule 1 may correspond, for example, to a 4G data flow. In this example, the second PCC rule, PCCRule2, has an RG of 7300 and service identifier of 2. In this example, PCCRule2 may correspond to a 5G data flow. The third PCC rule, PCCRule3, has an RG of 7300 and service identifier of 3. RCCRule3 may correspond, for example, to tethered data. For example, a subscriber may attach UE 110 to a user device, such as a tablet or laptop computer, via a wired or wireless connection (e.g., a Bluetooth connection). The subscriber may then access a network (e.g., access network 120, provider network 140, etc.) from the user device tethered to UE 110 via the wired or wireless connection. The data consumed by the subscriber while accessing the network on the user device via UE 110 is referred to herein as tethered data.

SMF 240 may receive the session rules from PCF 254 and, at signal 420, SMF 240 may send a charging data request associated with the session rules to CHF 260. The charging data request may indicate that there is a new session setup and may include an indication of the rating group (i.e., RG=7300). In addition, the charging data request may request verification that the subscriber exists and may request an indication of how much data the subscriber is authorized to use for the rating group (i.e., rating group 7300). After receiving the charging data request, CHF 260 may send SMF 240 a charging data response in signal 430. The charging data response may include several parameters associated with the user, the rating group, and service identifier. For example, the charging data response may indicate how much data the subscriber is authorized to use for the rating group (i.e., rating group 7300) in a particular period of time. The charging data response may additionally indicate how much data associated with one or more particular service data flows the subscriber is authorized to use in the particular amount of time.

In some prior implementations, CHF 260 has the ability to limit the amount of data the subscriber is authorized to use in a particular period of time based on the rating group, but not able to limit the amount of data the subscriber is authorized to use based on a service identifier. A charging data response from such CHF 260 may indicate a data quota the subscriber is authorized to use for a particular rating group without regard for different flows. However, CHF 260 may be unable to set data usage restrictions based on service flow.

As implemented herein, Nchf interface 272 for CHF 260 permits new data structures to be introduced into or passed from CHF 260 to SMF 240. CHF 260 with such Nchf interface 272 may send additional information to SMF 240, and SMF 240 may be able to decode the additional information and take action based on the additional information. For example, the new data structures may allow for usage monitoring at a per service identifier level. More particularly, the new data structures may include a "Service-ID-Usage-Monitoring-List" data structure that includes service identifiers and a volume quota (or UsageMonitoringThreshold) associated with the service identifiers. The new data structures may additionally include a "Service-ID-Exclusion-List" data structure that identifies one or more service identifiers that are excluded from using the shared data pool.

According to the implementations herein, CHF 260 and SMF 240 may support the new data structures. The new functions may allow usage monitoring at a per service identifier level and allow SMF 240 to report data usage to CHF 260 when SMF 240 detects that a volume threshold enforced by CHF 260 at the service identifier level is reached.

Figure 5B:
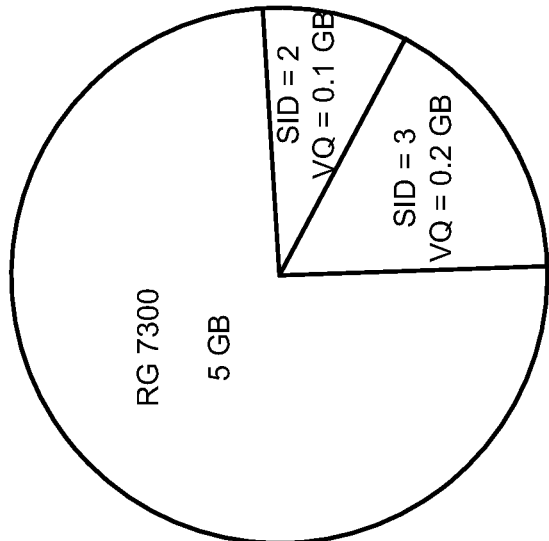
FIGS. 5A-5C are diagrams illustrating example scenarios according to implementations described herein.
Figure 5C:
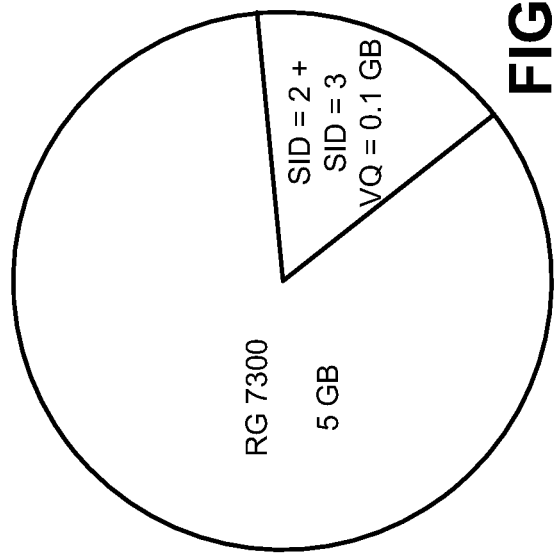
Figure 5A:
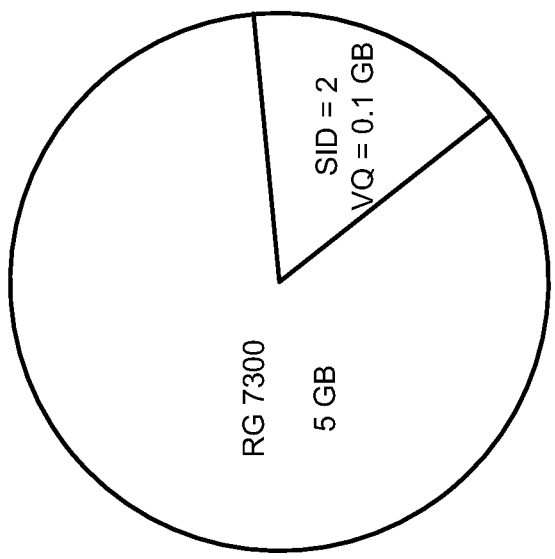

FIGS. 5A-5C illustrate several scenarios in which data associated with service data flows may be limited. In the example shown in FIG. 5A, a subscriber may be authorized to use 5 GB of data in rating group 7300. However, the subscriber may be authorized to use only 0.1 GB of data for service identifier 2 in rating group 7300. Based on the example given above, in the scenario shown in FIG. 5A, the subscriber may have a total quota of 5 GB to be consumed with data flows in rating group 7300, but the subscriber may only be authorized to use 100 MB of 5G data. In this example, signal 430 sent from CHF 260 to SMF 240, like the one shown in FIG. 4, may include a charging data response that indicates that, for the next particular period of time (e.g., 2 hours), the subscriber is authorized to use 1 GB of data in rating group 7300, but the subscriber is authorized to use only 0.1 GB of data in service identifier 2 of rating group 7300. In other words, for the next two hours, the subscriber is authorized to use 1 GB of data in rating group 7300, but only 0.1 GB of that data can be consumed in 5G data flows. In this scenario, the charging data response may indicate that the granted service unit (GSU) for RG 7300 is 1 GB and the volume quota (VQ) for service identifier 2 is 0.1 GB. The GSU indicates the amount of data that the user is authorized to use for a particular rating group based on a user's preferences. Therefore, for the scenario depicted in FIG. 5A, the charging data response may indicate RG=7300, GSU=1 GB, Service-ID-Usage-Monitoring-List{SID=2 VQ=0.1 GB}.

In the scenario depicted in FIG. 5B, the subscriber may be authorized to use 5 GB of data in rating group 7300. However, the subscriber may be authorized to use only 0.1 GB of data for service identifier 2 in rating group 7300 and 0.2 GB of data for service identifier 3 in rating group 7300. Based on the examples given above, in the scenario shown in FIG. 5B, the subscriber may have a total quota of 5 GB of data to be consumed with data flows in rating group 7300, but the subscriber may only be authorized to use 100 MB of 5G data and 200 MB of tethered data. In this example, the charging data response sent from CHF 260 to SMF 240 may indicates that, for the next particular period of time (e.g., 2 hours), the subscriber is authorized to use 1 GB of data in rating group 7300, but the subscriber is authorized to use only 0.1 GB of data in service identifier 2 of rating group 7300 and 0.2 GB of data in service identifier 3 of rating group 7300. In this scenario, the charging data response may indicate that the GSU for RG 7300 is 1 GB, the VQ for service identifier 2 is 0.1 GB, and the VQ for service identifier 3 is 0.2 GB. Therefore, for the scenario depicted in FIG. 5B, the charging data response may indicate that RG=7300, GSU=1 GB, Service-ID-Usage-Monitoring-List{SID=2 VQ=0.1 GB}, Service-ID-Usage-Monitoring-List{SID=3 VQ=0.2 GB}.

In the scenario depicted in FIG. 5C, the subscriber may be authorized to use 5 GB of data in rating group 7300, but the subscriber may be authorized to consume only 0.1 GB of data in a combination of service identifier 2 and service identifier 3 in rating group 7300. Based on the examples given above, in the scenario shown in FIG. 5C, the subscriber may have a total quota of 5 GB of data to be consumed with data flows in rating group 7300, but the subscriber may only be authorized to use 100 MB of data in a combination of 5G data and tethered data. In this example, CHF 260 may send a charging data response to SMF 240 that indicates that, for the next particular period of time (e.g., 2 hours), the subscriber is authorized to use 1 GB of data in rating group 7300, but the subscriber is authorized to use only 0.1 GB of combined data in service identifier 2 and service identifier 3 of rating group 7300. In this scenario, the charging data response may indicate that the GSU for RG 7300 is 1 GB and the VQ for a combination of service identifier 2 and service identifier 3 is 0.1 GB. Therefore, for the scenario depicted in FIG. 5C, the charging data response may indicate that RG=7300, GSU=1 GB, Service-ID-Usage-Monitoring-List{SID=2 SID=3 VQ=0.1 GB}.

Returning to FIG. 4, in signal 440, SMF 240 may send a charging data request update to CHF 260 reporting the user's data usage after the period of time has ended. SMF 240 may identify service flows used by a subscriber based on a destination IP address and/or port number. Additionally, SMF 240 may store a mapping table that maps service flows to a combination of rating group and service identifier. Therefore, SMF 240 may be able to report the user's data usage using the rating group and service identifier associated with each data flow associated with the user's data consumption. The charging data request update may indicate that, for example, during the time period, the subscriber consumed 0.85 GB of data in rating group 7300 and 0.80 GB of data in SID 1, 0.02 GB in SID 2, and 0.03 GB in SID 3.

In signal 450, CHF 260 may send SMF 240 a charging data response that indicates an amount of data the subscriber is authorized to use for the next period of time (e.g., 2 hours). In the scenario depicted in FIG. 5A, the subscriber has an additional 4.15 GB of data to consume in rating group 7300 (since the original quota was 5 GB and the user consumed 0.85 GB of data) and an additional 0.08 GB of data to consume in service identifier 2 (since the user was authorized to use 0.1 GB of data in service identifier 2 and the user consumed 0.02 GB of data). Therefore, for the scenario depicted in FIG. 5A, CHF 260 may authorize the user to use, for example, an additional 1 GB of data in rating group 7300 in the next 2 hours and the remainder of the subscriber's data quota for SID 2. Therefore, the charging data response may indicate that RG=7300, GSU=1 GB, Service-ID-Usage-Monitoring-List{SID=2 VQ=0.08 GB}.

In the scenario depicted in FIG. 5B, the subscriber has an additional 4.15 GB of data to consume in rating group 7300, an additional 0.08 GB of data to consume in service identifier 2, and an additional 0.17 GB of data to consumer in service identifier 3. Therefore, for the scenario depicted in FIG. 5B, CHF 260 may authorize the user to use an additional 1 GB of data in rating group 7300 in the 2 hours and the charging data response may indicate that RG=7300, GSU=1 GB, Service-ID-Usage-Monitoring-List{SID=2 VQ=0.08 GB}, Service-ID-Usage-Monitoring-List{SID=3 VQ=0.17 GB}.

In the scenario depicted in FIG. 5C, the subscriber has an additional 4.15 GB of data to consume in rating group 7300 and an additional 0.05 GB of data to consume in a combination of service identifier 2 and service identifier 3. Therefore, for the scenario depicted in FIG. 5C, CHF 260 may authorize the user to use an additional 1 GB of data in rating group 7300 in the 2 hours and the charging data response may indicate that RG=7300, GSU=1 GB, Service-ID-Usage-Monitoring-List{SID=2 SID=2 VQ=0.05 GB}.

By allowing the new data structure to be passed through Nchf interface 272 and by implementing the new functions in CHF 260 and SMF 240, CHF 260 may be able to better control how much data is consumed by a subscriber in different data flows. For example, instead of allotting a subscriber an amount of data to be used in a rating group, CHF 260 may be able to allot data to be used within different service flows or service identifiers. In this way, CHF 260 may be able to ensure that a subscriber does not use more data in particular data flows than is authorized by the subscriber's service plan and that the subscriber is not charged for additional data.

Figure 6:
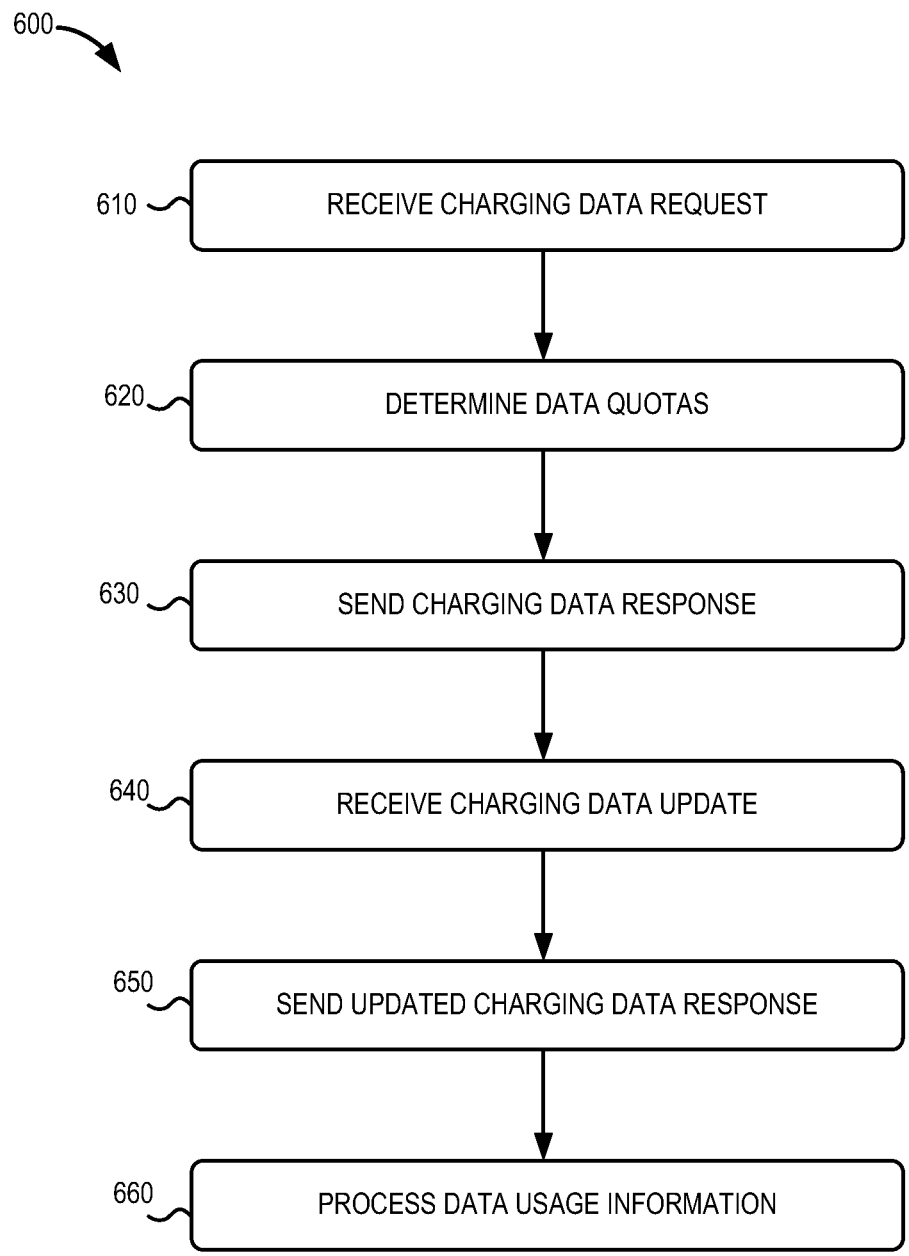
FIG. 6 is a flow diagram illustrating an exemplary process for monitoring data usage, according to an implementation described herein.

FIG. 6 is a flow diagram illustrating an exemplary process 600 for performing data monitoring. In one implementation, process 600 may be implemented by CHF 260 in connection with SMF 240 and one or more other components/devices in network environment 100.

Referring to FIG. 6, process 600 may include receiving, at CHF 260, a charging data request from SMF 240 (block 610). For example, according to one implementation, CHF 260 may receive a charging data request indicating that a new user session is being set up. The charging data request may include an identifier associated with the user, a rating group identifier associated with a data service flow being used by the user, and one or more service identifiers associated with service flows being used by the user.

CHF 260 may determine one or more data quotas associated with the user (block 620). For example, CHF 260 may store subscription information associated with the user. The subscription information may indicate an amount of data the user is authorized to use during a time period (e.g., one month). The subscription information may additionally indicate how much data the user is authorized to use within a particular rating group and one or more service identifiers. For example, a subscription associated with a user may indicate that the user is authorized to use more 4G data than 5G data each month. Therefore, the subscription may indicate different data quotas for different data flows or service identifiers.

CHF 260 may send SMF 240 a charging data response indicating data quotas (block 630). For example, CHF 260 may send SMF 240 a charging data response that indicates an amount of data the user is authorized to use in a particular rating group in a particular period of time. The charging data response may additionally indicate a usage monitoring threshold for the subscriber for particular data flows. As one example, the charging data response may indicate a data quota for a rating group and a data usage monitoring threshold for a particular service identifier within the rating group. As another example, the charging data response may indicate a data quota for a rating group, a first data usage monitoring threshold for a first service identifier within the rating group, and a second data usage monitoring threshold for a second service identifier within the rating group. As a third example, the charging data response may indicate a data quota for a rating group and a data usage monitoring threshold for a combination or one or more service identifiers within the rating group.

CHF 260 may receive a charging update from SMF 240 with data usage information (block 640). For example, after the period of time has expired or the subscriber has reached a data usage monitoring threshold, SMF 240 may send CHF 260 a charging update indicating the amount of data used by the subscriber. The charging update may indicate that amount of data consumed on a per service identifier basis. For example, the charging update may indicate how much data the subscriber consumed in each service identifier flow of a rating group during the period of time.

CHF 260 may send an updated charging data response to SMF 240 (block 650). For example, based on the data quotas associated with the user and the amount of data consumed by the user, CHF 260 may determine updated data usage monitoring thresholds indicating an amount of data that the user is authorized to use and CHF 260 may send an updated charging data response including the updated data usage monitoring thresholds. In one implementation, the updated charging data response may include an indication of updated data usage monitoring thresholds for particular rating group and service identifier combinations.

CHF 260 may additionally process the received data usage information (block 660). For example, CHF 260 may update counters with the data usage information, generate charging data responses based on the data usage information, send records to be billed based on the data usage information, or process the data usage information in additional ways.

The foregoing description of implementations provides illustration and description, but is not intended to be exhaustive or to limit the invention to the precise form disclosed. Modifications and variations are possible in light of the above teachings or may be acquired from practice of the invention. For example, while a series of message flows have been described with respect to FIG. 4 and a series of blocks have been described with regard to FIG. 6, the order of the message/operation flows and blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
   receiving, at a network device and from a session management device, a message including a first identifier associated with a subscriber and a second identifier associated with a rating group associated with one or more data flows;
   determining, by the network device, a data quota and one or more usage monitoring thresholds associated with the subscriber,
   wherein the data quota indicates a first amount of data associated with the rating group that the subscriber is authorized to use during a time period and the one or more usage monitoring thresholds indicate one or more second amounts of data associated with one or more service flows associated with the rating group that the subscriber is authorized to use during the time period;
   transmitting, by the network device and to the session management device, the data quota and the one or more usage monitoring thresholds;
   receiving, at the network device and from the session management device, data usage information associated with the subscriber, the rating group, and the one or more service flows when the time period has expired; and
   transmitting, by the network device, an indication that the data quota or one of the usage monitoring thresholds has been reached when the data usage information indicates that the data quota or the one of the usage monitoring thresholds has been reached.

2. The method of claim 1, wherein the one or more usage monitoring thresholds include a first usage monitoring threshold that indicates a third amount of data that the subscriber is authorized to use during the time period and a second usage monitoring threshold that indicates a fourth amount of data that the subscriber is authorized to use during the time period, wherein the first usage monitoring threshold is associated with a first service flow of the one or more service flows and the second usage monitoring threshold is associated with a second service flow of the one or more service flow.

3. The method of claim 1, wherein the one or more usage monitoring thresholds include a first usage monitoring threshold that indicates an amount of data associated with a combination of a first service flow and a second service flow of the one or more service flows that the subscriber is authorized to use during the time period.

4. The method of claim 1, further comprising updating a data counter with the data usage information.

5. The method of claim 1, wherein each service flow of the one or more service flows is associated with the rating group and a service identifier.

6. The method of claim 5, wherein each service identifier is associated with a different data flow of the one or more data flows.

7. The method of claim 1, further comprising generating a usage report based on the rating group and the one or more service flows.

8. A device comprising:
   one or more memories to store instructions; and
   one or more processors configured to execute the instructions to:
      receive, from a session management device, a message including a first identifier associated with a subscriber and a second identifier associated with a rating group associated with one or more data flows;
      determine a data quota and one or more usage monitoring thresholds associated with the subscriber,
      wherein the data quota indicates a first amount of data associated with the rating group that the subscriber is authorized to use during a time period and the one or more usage monitoring thresholds indicate one or more second amounts of data associated with one or more service flows associated with the rating group that the subscriber is authorized to use during the time period;

transmit, to the session management device, the data quota and the one or more usage monitoring thresholds;

receive, from the session management device, data usage information associated with the subscriber, the rating group, and the one or more service flows when the time period has expired; and transmit an indication that the data quota or one of the usage monitoring thresholds has been reached when the data usage information indicates that the data quota or the one of the usage monitoring thresholds has been reached.

9. The device of claim 8, wherein the one or more usage monitoring thresholds include a first usage monitoring threshold that indicates a third amount of data that the subscriber is authorized to use during the time period and a second usage monitoring threshold that indicates a fourth amount of data that the subscriber is authorized to use during the time period, wherein the first usage monitoring threshold is associated with a first service flow of the one or more service flows and the second usage monitoring threshold is associated with a second service flow of the one or more service flows.

10. The device of claim 8, wherein the one or more usage monitoring thresholds include a first usage monitoring threshold that indicates an amount of data associated with a combination of a first service flow and a second service flow of the one or more service flows that the subscriber is authorized to use during the time period.

11. The device of claim 8, wherein the one or more processors are further configured to update a data counter with the data usage information.

12. The device of claim 8, wherein each service flow of the one or more service flows is associated with the rating group and a service identifier.

13. The device of claim 12, wherein each service identifier is associated with a different data flow of the one or more data flows.

14. The device of claim 8, wherein the one or more processors are further configured to generate a usage report based on the rating group and the one or more service flows.

15. A non-transitory computer-readable medium containing instructions executable by at least one processor, the computer-readable medium comprising one or more instructions to cause the at least one processor to:

receive, from a session management device, a message including a first identifier associated with a subscriber and a second identifier indicating a rating group associated with one or more data flows;

determine a data quota and one or more usage monitoring thresholds associated with the subscriber, wherein the data quota indicates a first amount of data associated with the rating group that the subscriber is authorized to use during a time period and the one or more usage monitoring thresholds indicate one or more second amounts of data associated with one or more service flows that the subscriber is authorized to use during the time period;

transmit, to the session management device, the data quota and the one or more usage monitoring thresholds;

receive, from the session management device, data usage information associated with the subscriber, the rating group, and the one or more service flows when the time period has expired; and transmit an indication that the data quota or one of the usage monitoring thresholds has been reached when the data usage information indicates that the data quota or the one of the usage monitoring thresholds has been reached.

16. The non-transitory computer-readable medium of claim 15, wherein the one or more usage monitoring thresholds include a first usage monitoring threshold that indicates a third amount of data that the subscriber is authorized to use during the time period and a second usage monitoring threshold that indicates a fourth amount of data that the subscriber is authorized to use during the time period, wherein the first usage monitoring threshold is associated with a first service flow of the one or more service flows and the second usage monitoring threshold is associated with a second service flow of the one or more service flows.

17. The non-transitory computer-readable medium of claim 15, wherein the one or more usage monitoring thresholds include a first usage monitoring threshold that indicates an amount of data associated with a combination of a first service flow and a second service flow of the one or more service flows that the subscriber is authorized to use during the time period.

18. The non-transitory computer-readable medium of claim 15, wherein the instructions further include one or more instructions that cause the at least one processor to update a data counter with the data usage information.

19. The non-transitory computer-readable medium of claim 15, wherein each service flow of the one or more service flows is associated with the rating group and a service identifier and wherein each service identifier is associated with a different data flow of the one or more data flows.

20. The non-transitory computer-readable medium of claim 15, wherein the instructions further include one or more instructions that cause the at least one processor to generate a usage report based on the rating group and the one or more service flows.

* * * * *